United States Patent
Saito et al.

(10) Patent No.: US 7,716,458 B2
(45) Date of Patent: May 11, 2010

(54) RECONFIGURABLE INTEGRATED CIRCUIT, SYSTEM DEVELOPMENT METHOD AND DATA PROCESSING METHOD

(75) Inventors: Miyoshi Saito, Kawasaki (JP); Yoshio Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 10/461,427

(22) Filed: Jun. 16, 2003

(65) Prior Publication Data

US 2004/0001296 A1    Jan. 1, 2004

(30) Foreign Application Priority Data

Jun. 28, 2002    (JP) .............................. 2002-190555

(51) Int. Cl.
*G06F 9/00* (2006.01)
(52) U.S. Cl. .................................... 712/226
(58) Field of Classification Search .................. 712/226
See application file for complete search history.

(56) References Cited

U.S. PATENT DOCUMENTS

| | | | | |
|---|---|---|---|---|
| 5,095,522 A | * | 3/1992 | Fujita et al. ................. | 719/316 |
| 5,457,644 A | * | 10/1995 | McCollum ................. | 708/230 |
| 5,541,849 A | * | 7/1996 | Rostoker et al. .............. | 716/18 |
| 6,567,837 B1 | * | 5/2003 | Robinson ........................ | 718/1 |
| 2003/0163298 A1 | * | 8/2003 | Odom et al. ................... | 703/21 |

FOREIGN PATENT DOCUMENTS

| | | |
|---|---|---|
| JP | 09-294069 | 11/1997 |
| WO | 00/49496 | 8/2000 |

OTHER PUBLICATIONS

Agrawal, Om. Harding, Bill. "New FPGA Architectures Address Wide Gating Functions". pp. 1-6, Publiahws Jan. 20, 1999.*
Webopedia. ("Granularity" definition). Oct. 30, 2001. Obtained via http://www.webopedia.com/TERM/G/granularity.html.*
Hui Zhang, et al. "A 1V Heterogeneous Reconfigurable Processor IC for Baseband Wireless Applications," 2000 IEEE International Solid-State Circuits Conference, Session 4, Paper MP4.1, Feb. 7, 2000.
Japanese Office Action mailed Nov. 14, 2006 in corresponding Japanese application No. 2002-190555.

* cited by examiner

*Primary Examiner*—Eddie P Chan
*Assistant Examiner*—Robert E Fennema
(74) *Attorney, Agent, or Firm*—Staas & Halsey LLP

(57) ABSTRACT

An integrated circuit includes a processor. An arithmetic logic circuit group includes a plurality of operation units and a connection channel connecting the operation units in a reconfigurable manner. Parameter-based dedicated hardware can change a process specification thereof by parameter setting. An intermodule interface connects the processor, the arithmetic logic circuit group, and the parameter-based hardware to each other.

14 Claims, 15 Drawing Sheets

RECONFIGURABLE INTEGRATED CIRCUIT, SYSTEM DEVELOPMENT METHOD AND DATA PROCESSING METHOD

CROSS-REFERENCE TO RELATED APPLICATIONS

The present application is based on Japanese priority application No. 2002-190555 filed on Jun. 28, 2002, the entire contents of which are hereby incorporated by reference.

BACKGROUND OF THE INVENTION

1. Field of the Invention

The present invention generally relates to integrated circuits, and more particularly, to an integrated circuit capable of reconfiguration on the logic thereof.

2. Description of the Related Art

When a process to be executed is determined in advance, it is possible to realize a system that executes the process with high performance and at low power consumption by designing a dedicated LSI for the process. When executing a different process by changing the specification, however, it is necessary to redesign and remanufacture the LSI from scratch. Thus, dedicated LSIs possess very low specification change capability (capability of allowing specification change).

An example of configurations having high specification change capability is a configuration in which software is executed on a processor and the specification change is realized through rewriting the software. In this case, the specification change capability is very high. However, since the processor is configured such that general-purpose processes can be executed, the processor possesses high redundancy, resulting in low processing performance and high power consumption.

FPGAs (Field Programmable Gate Arrays) allow free reconfiguration of connections among logic devices by writing configuration data to a memory, so that change can be made for each gate. The FPGA possesses specification change capability, however, it is necessary to start over from RTL (Register Transfer Logic) design for specification change. Accordingly, though it is not necessary to remanufacture hardware as in dedicated LSIs, in terms of the logic design, labor equivalent to that required in changing the design of dedicated LSIs is required. In addition, because of the high redundancy of the hardware, the circuit size is increased to approximately ten times the size of a dedicated LSI, resulting in high cost and high power consumption.

Additionally, in SOCs (System on Chips), a processor and dedicated hardware are formed by the same LSI chip. The processor is used for controlling the dedicated hardware. The same problems of the above-described dedicated LSIs apply to the dedicated hardware.

Further, there is a configuration in which the FPGA and a processor are used together and dedicated hardware is controlled by the processor. In this configuration, regarding the FPGA, the same problems of the above-mentioned FPGA are applicable.

In addition, considering programming, even in a system having high specification change capability formed by a processor and software, when working out the design in a top-down manner, a lot of effort and time, that is, considerable work, load is required for the specification change of the software. In a top-down approach, the procedure is expressed by a flowchart. Thus, it is not easy to rewrite the flowchart and change the software. For instance, when a new process is added, it is necessary to add a conditional branch to a part of the existing program. This raises the need to further develop a process after the branch, in addition to merely adding the new process. When the software is changed repeatedly, the readability and ease of maintenance of the programs are degraded. Consequently, errors are increased and modification becomes impossible.

Additionally, in terms of programming, SOCs suffer from difficulty in assigning roles to software and hardware. In SOCs, a designer assigns processes to software and hardware based on his/her empirical knowledge in the initial stage of designing. Consequently, in many cases, the assignment of the processes is not optimized. Moreover, it is difficult to change the boundary between the software and hardware assignments later.

In other word, when assigning roles (processes) to software and hardware with a top-down approach, all the processes are considered in the initial stage of designing. Then, the processes causing heavy process load, which are empirically determined, are assigned to the hardware, and the processes causing light process load are assigned to the software. The system configuration obtained by such a designing method is not always optimized. It is not impossible to perform transition of processes from the hardware to the software later. In order to perform transition of processes from the software to the hardware, however, design change of the hardware and a manufacturing process in the factory are required.

The system called "Pleiades" (Hui Zhang, Vandana Prabhu, Varghese George, Marlene Wan, Martin Benes, Arthur Abnous, "A 1V Heterogenerous Reconfigurable Processor IC for Baseband Wireless Applications", Proceedings of ISSCC2000) is proposed as a method for solving the problems as described above. The "Pleiades" includes a processor, a MAC (multiplier accumulator), an ALU (arithmetic logic unit), an AGU (address generating unit), a MEM (memory), an FPGA, and the like that are connected via a bus, and is designed to execute a single thread/process.

The "Pleiades" provides, in addition to a processor, a plurality of kinds of reconfigurable modules, each having a different granularity (the size of a reconfigurable unit), and dedicated hardware so as to offer an optimized configuration in terms of specification change capability, performance, and power consumption. The designing method, however, is in a top-down manner. Thus, processes to be transitioned from software operation to hardware (including a reconfigurable part) are determined, and optimization is performed by transitioning the processes to the hardware. Accordingly, the design change for the transition takes time.

In addition, the "Pleiades" performs signal processing by assigning a single process (or single thread) to each module. Thus, frequent data transfer is required among the modules, and the processing performance is limited by the resources in signal transmission channels among the modules. Considering such conditions from the viewpoint of hardware, in the "Pleiades", each operation unit such as the MAC (multiplier accumulator) and the ALU (arithmetic logic unit), the FPGA, and the processor are provided in the same layer on the signal transmission channel. Accordingly, the amount of data transfer between the operation units, between the operation unit and the FPGA, or between the operation unit and the processor is increased, which causes degradation in the processing performance.

SUMMARY OF THE INVENTION

It is a general object of the present invention to provide an improved and useful integrated circuit, system development method, and data processing method in which one or more of the above-mentioned problems are eliminated.

It is another and more specific object of the present invention to provide a reconfigurable integrated circuit that mounts thereon a plurality of modules each having a different specification change capability (capability of allowing specification change), performance, and power consumption, allows optimum assignment of processes, and requires a comparatively small amount of transfer in signal transmission channels.

In order to achieve the above-mentioned objects, according to one aspect of the present invention, there is provided an integrated circuit that includes:

a processor;

an arithmetic logic circuit group including a plurality of operation units and a connection channel connecting the operation units in a reconfigurable manner;

parameter-based dedicated hardware capable of changing a process specification thereof by parameter setting; and an intermodule interface connecting the processor, the arithmetic logic circuit group, and the parameter-based hardware to each other.

According to the above-mentioned aspect of the present invention, it is possible to optimize power consumption, performance, and specification change capability by mounting a plurality of different modules each having a different granularity (the size of a reconfigurable unit). In addition, each arithmetic logic circuit is not independently connected to the intermodule interface, but a reconfigurable connection channel is provided in and the plurality of arithmetic logic circuits are included in the arithmetic logic circuit group. Thus, a construction in which data transfer among the plurality of operation units is conducted within the arithmetic logic circuit group is realized. Accordingly, in the present invention, it is possible to achieve a high system performance without limiting the processing speeds of the operation units by the data transfer rate of the intermodule interface.

In addition, according to another aspect of the present invention, there is provided a system development method of programming an integrated circuit that includes a processor, an arithmetic logic circuit group having a plurality of operation units and a connection channel connecting the operation units in a reconfigurable manner, parameter-based dedicated hardware capable of changing a process specification thereof by parameter setting, and an intermodule interface connecting the processor, the arithmetic logic circuit group, and the parameter-based dedicated hardware to each other, the system development method including the steps of:

generating objects and relationships among the objects through object analysis;

generating processes each including at least one of the objects by putting the objects that are related to each other together; and assigning the processes to the processor, the arithmetic logic circuit group, and the parameter-based dedicated hardware of the integrated circuit.

According to the above-mentioned aspect of the present invention, it is possible to easily perform specification change caused by change of objects, for example, by constructing a system including hardware with objects. Those objects mapped to the processor part and the reconfigurable hardware parts allow the specification change. Also, the relationships between the objects that are the targets of specification change and the modules of an integrated circuit are clear. Thus, it is possible to easily perform specification change.

Other objects, features and advantages of the present invention will become more apparent from the following detailed description when read in conjunction with the following drawings.

DETAILED DESCRIPTION OF THE PREFERRED EMBODIMENTS

A detailed description will now be given of preferred embodiments of the present invention, with reference to the drawings.

Figure 1:
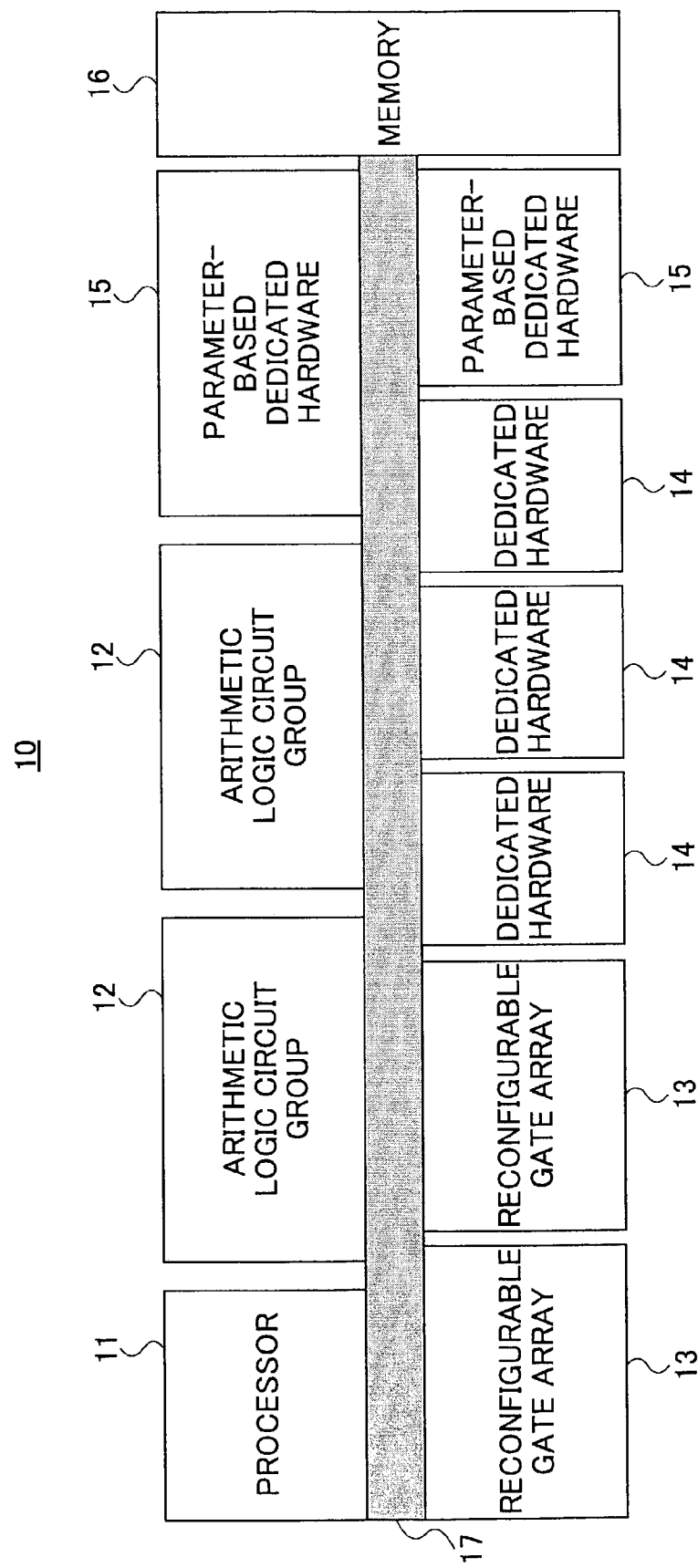
FIG. 1 is an illustrative drawing showing the construction of an application-specific platform LSI according to the present invention.

FIG. 1 is an illustrative drawing showing the construction of an application-specific platform LSI according to the present invention.

In FIG. 1, an application-specific platform LSI 10 includes a processor 11, an arithmetic logic circuit group 12 that is constructed by a plurality of operation units and can reconfigure the flow of operations by allowing the connection among the operation units to be varied, a reconfigurable gate array 13 that allows logic change at the gate level, dedicated hardware 14 for executing specific processes, parameter-based dedicated hardware (dedicated hardware configurable by at least one parameter) 15 that allows specification change of specific processes by setting parameters, a memory (shared memory) 16 used in common, and an intermodule interface 17. It should be noted that FIG. 1 shows a plurality of the arithmetic logic circuit groups 12, reconfigurable gate arrays 13, the dedicated hardware 14, and the parameter-based dedicated hardware 15; however, there is no particular limitation with respect to the numbers. For each kind of the above modules, only one may be provided. Additionally, in the present invention, the application-specific platform LSI 10 includes at least the processor 11, the arithmetic logic circuit group 12, and the parameter based dedicated hardware 15. The reconfigurable gate array 13 and the dedicated hardware 14, which are the other logic modules, are optional.

In the present invention, it is possible to optimize power consumption, performance, and specification change capability (capability of allowing specification change) by mounting a plurality of different modules, each having a different granularity (the size of a reconfigurable unit) as shown in FIG. 1. That is, it is possible to optimize power consumption and performance by assigning/executing each of the processes to/by the optimum module, and to realize the optimum specification change capability by considering the assignment of the processes to modules in consideration of the size of a unit of change required in specification change.

Figure 2:
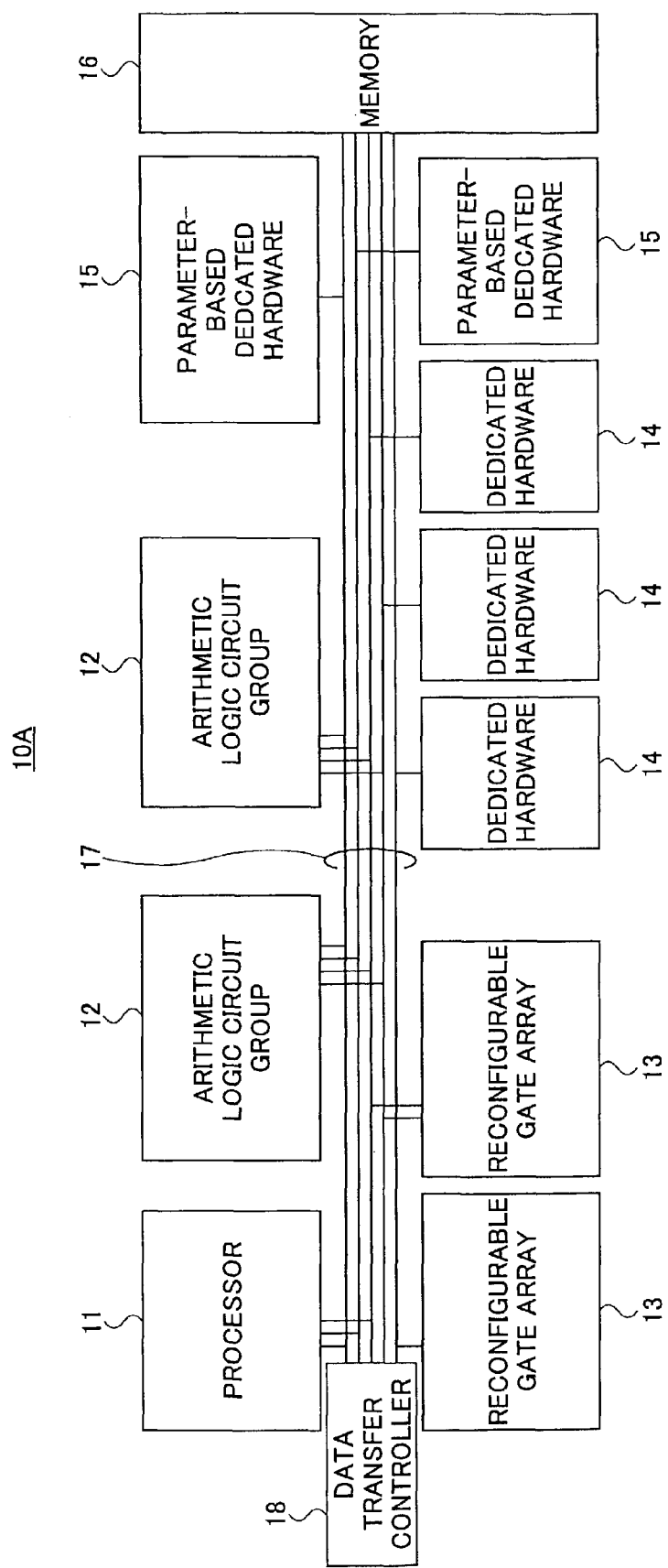
FIG. 2 is an illustrative drawing showing the construction of a first embodiment of the application-specific platform LSI.

FIG. 2 is an illustrative drawing showing the construction of a first embodiment of an application-specific platform LSI. In FIG. 2, those parts that are the same as those corresponding parts in FIG. 1 are designated by the same reference numerals, and a description thereof will be omitted.

An application-specific platform LSI 10A shown in FIG. 2 includes a data transfer controller 18 in addition to the components shown in FIG. 1. In addition, the intermodule interface 17 is constructed by a plurality of buses, and the data transfer controller 18 controls data transfer on the buses. Further, in addition to the shared memory 16, each module may be provided with a local memory.

Figure 3:
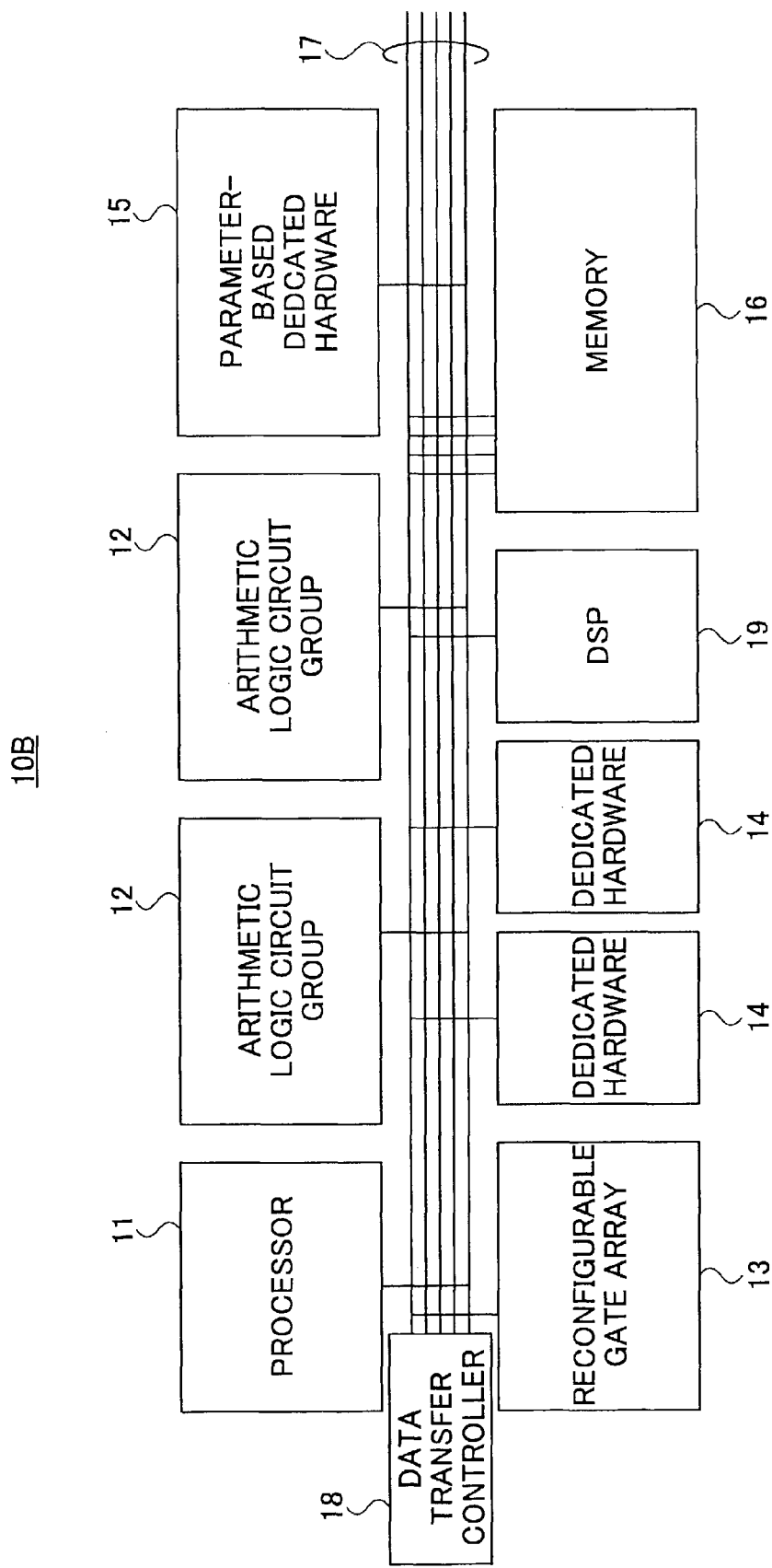
FIG. 3 is an illustrative drawing showing the construction of a second embodiment of the application-specific platform LSI.

FIG. 3 is an illustrative drawing showing the construction of a second embodiment of an application-specific platform LSI. In FIG. 3, those parts that are the same as those corresponding parts in FIG. 1 are designated by the same reference numerals, and a description thereof will be omitted.

An application-specific platform LSI 10B shown in FIG. 3 includes the data transfer controller 18 and a DSP 19 in addition to the components shown in FIG. 1. Also, the intermodule interface 17 is constructed by a cross bar, and the data transfer controller 18 controls data transfer on the cross bar. Hence, it is possible to provide a reconfigurable intermodule interface that can vary connection of intermodule signal channels. Further, in addition to the shared memory 16, each module may be provided with a local memory. In addition, for example, the shared memory 16 may be a 4-port memory with 16 banks, and the competition for memory access may be eliminated by the bank configuration.

Figure 4:
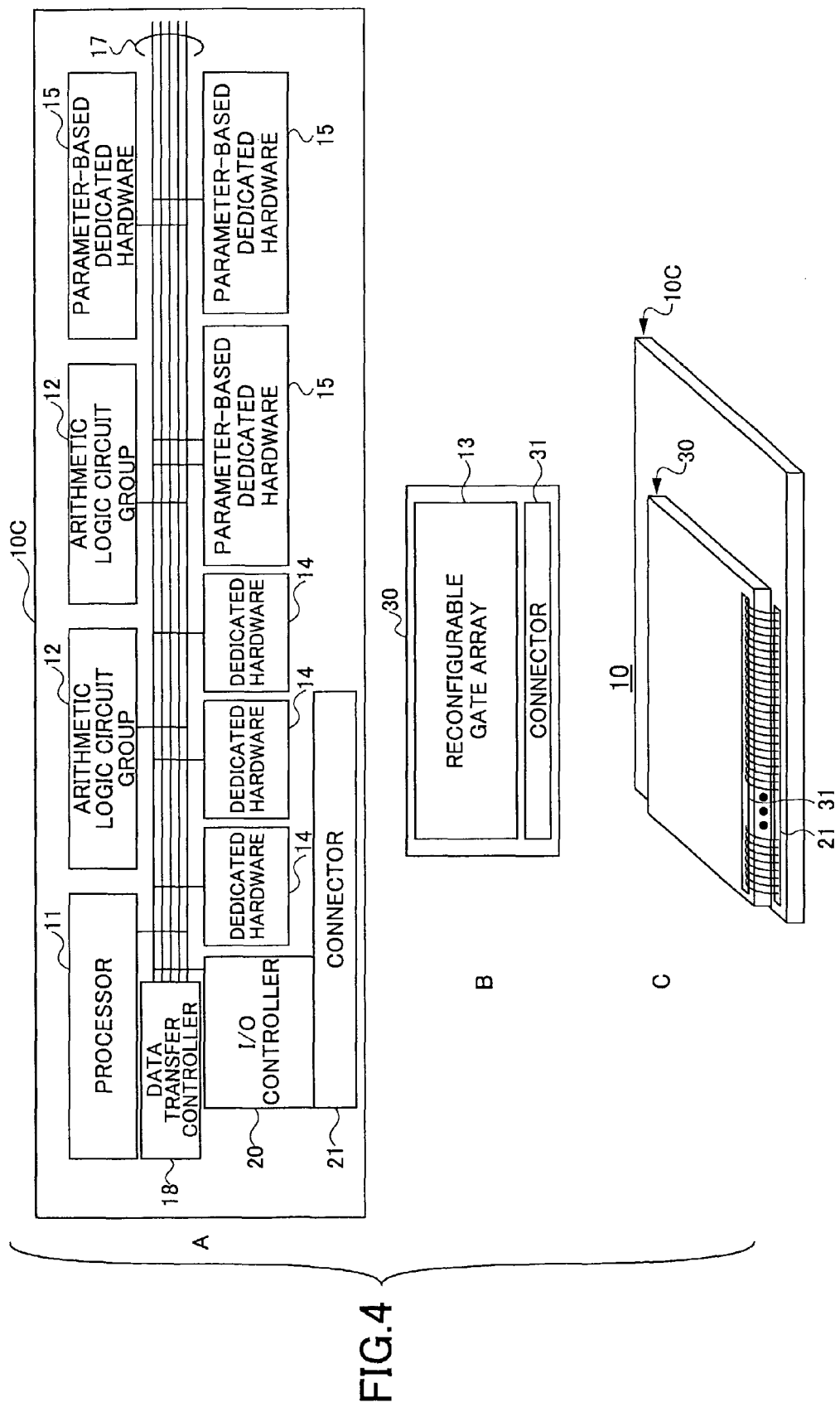
FIG. 4 is an illustrative drawing showing the construction of a third embodiment of an application-specific platform LSI.

FIG. 4 is an illustrative drawing showing the construction of a third embodiment of an application-specific platform LSI. In FIG. 4, those parts that are the same as those corresponding parts in FIG. 3 are designated by the same reference numerals, and a description thereof will be omitted.

An application-specific platform LSI 10C indicated by FIG. 4-A includes the processor 11, the arithmetic logic circuit groups 12, the dedicated hardware 14, the parameter-based dedicated hardware 15, the intermodule interface 17 realized by the cross bar, the data transfer controller 18, an I/O controller 20, and a connector 21. The application-specific platform LSI 10C is not provided with the reconfigurable gate array 13.

FIG. 4-B shows a reconfigurable gate array LSI 30 connected to the application-specific platform LSI 10C. The reconfigurable gate array LSI 30 includes the reconfigurable gate array 13 and a connector 31.

FIG. 4-C shows a construction in which the application-specific platform LSI 10C and the reconfigurable gate array LSI 30 are connected to each other by stacking the reconfigurable gate array LSI 30 on the application-specific platform LSI 10C. It is possible for the application-specific platform LSI 10C to use the function of the reconfigurable gate array 13 by connecting the connectors 21 and 31 with wires. It should be noted that FIG. 4-C indicates a stacked construction, however, the two chips may be arranged on one plane and mounted on a substrate. Further, the two-chip construction is not a limitation, and three or more chips may be mounted on a substrate by further arranging the LSIs.

Figure 5:
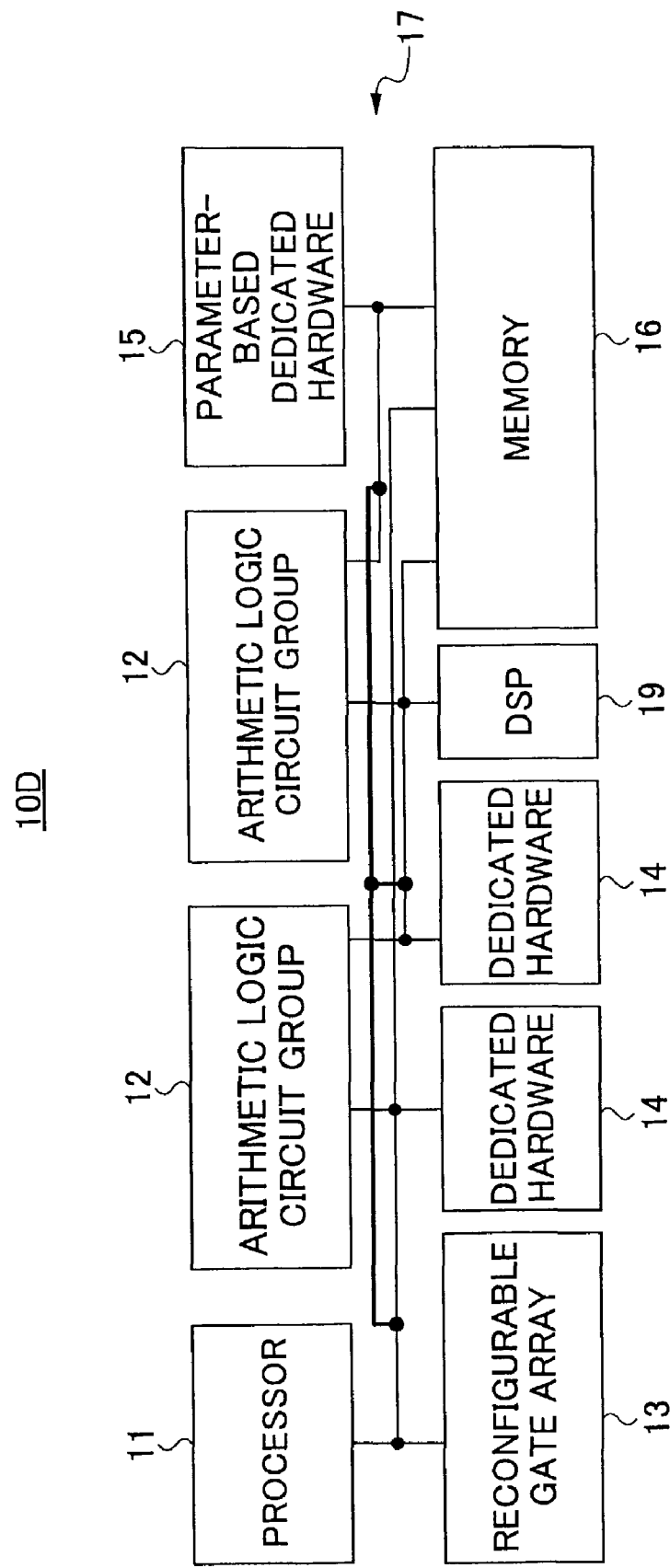
FIG. 5 is an illustrative drawing showing the construction of a fourth embodiment of an application-specific platform LSI.

FIG. 5 is an illustrative drawing showing the construction of a fourth embodiment of an application-specific platform LSI. In FIG. 5, those parts that are the same as those corresponding parts in FIG. 1 are designated by the same reference numerals, and a description thereof will be omitted.

An application-specific platform LSI 10D shown in FIG. 5 includes the processor 11, the arithmetic logic circuit groups 12, the reconfigurable gate array 13, the dedicated hardware 14, the parameter-based dedicated hardware 15, the memory 16, the intermodule interface 17, and the DSP 19. In the construction of the fourth embodiment, the intermodule interface 17 is realized by a hierarchical bus. In the hierarchical bus, the adjacent modules are connected via a lower layer bus, and data transfer between the distant modules is performed via an upper bus (shown with the bold line). In the example shown in FIG. 5, the two-layer bus is used. The number of layers, however, is not limited to two, and may be three or more.

Figure 6:
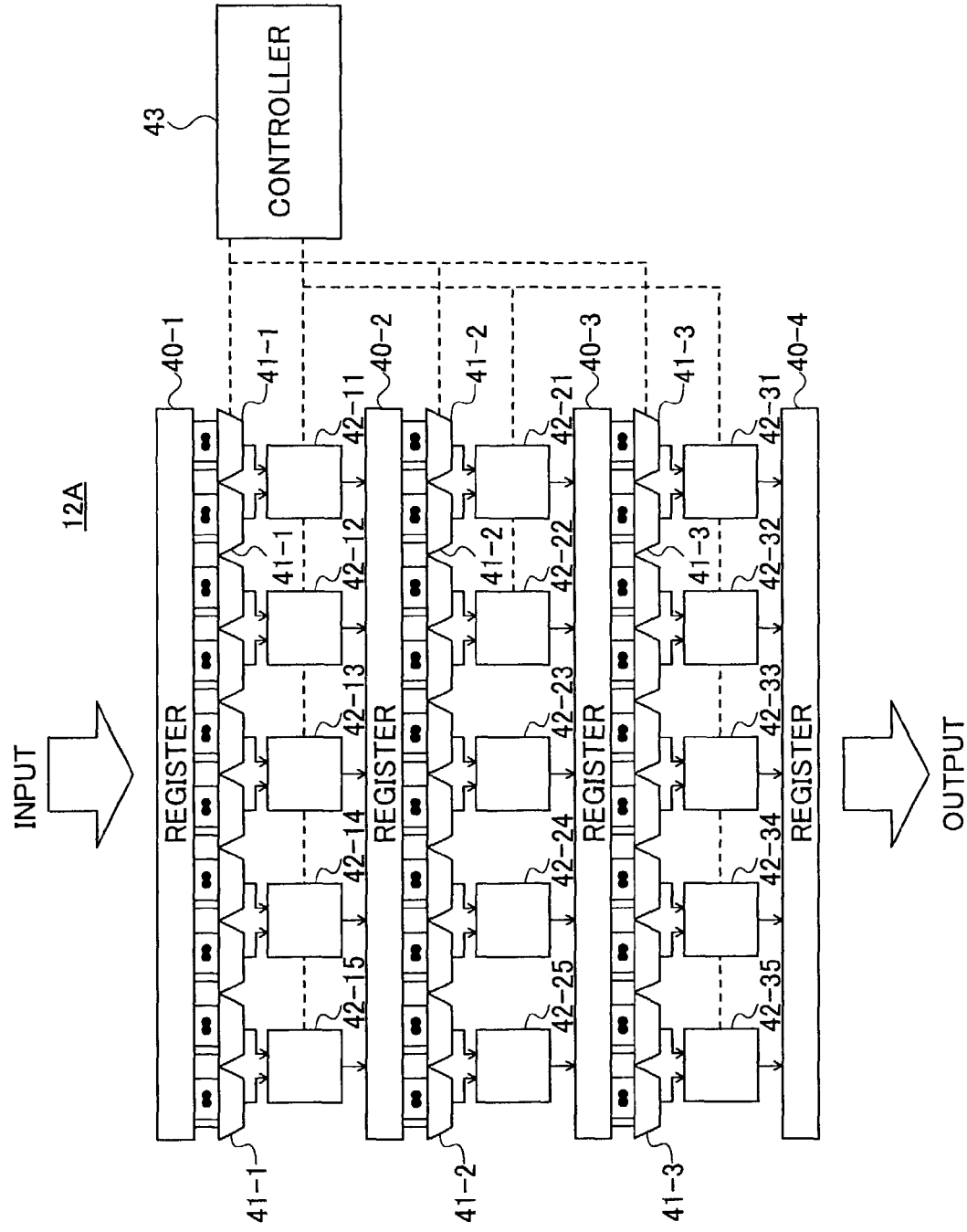
FIG. 6 is an illustrative drawing showing the construction of a first embodiment of an arithmetic logic circuit group.

FIG. 6 is an illustrative drawing showing the construction of a first embodiment of the arithmetic logic circuit group 12.

An arithmetic logic circuit group 12A shown in FIG. 6 includes registers 40-1 through 40-4, a plurality of selectors 41-1 through 41-3, operation units 42-11 through 42-15, 42-21 through 42-25, and 42-31 through 42-35, and a controller 43. Data supplied from the intermodule interface 17 are input to and temporarily maintained in the register 40-1. The register 40-1 is provided with a plurality of register circuits and can store a plurality of data simultaneously. The data of the register 40-1 are supplied to the operation units 42-11 through 42-15 via the selectors 41-1 that are controlled by the controller 43.

The operation units 42-11 through 42-15 are operation units of different kinds. For example, the operation units 42-11, 42-12, and 42-13 are an 8-bit MPY (multiplier), a 16-bit MPY (multiplier), and a MAC (multiplier accumulator), respectively. The operation units 42-14 and 42-15 are, for example, ALUs (arithmetic logic units). The operation units 42-11 through 42-15 are operated under the control of the controller 43, each receiving two data, executing a predetermined operation, and outputting one datum. The output data are supplied to the register 40-2. In this manner, the operation by the operation unit array in the first stage ends. In addition, it is not necessary that the operation units 42-11 through 42-15 be of different kinds, and may be operation units (ALUs, for example) of the same kind.

The second and third stages are constructed similarly to the first stage. The data of the register 40-2 are supplied to the operation units 42-21 through 42-25 via the selectors 41-2, predetermined operations are executed, and the operation results are supplied to the register 40-3. The data of the register 40-3 are supplied to the operation units 42-31 through 42-35 via the selectors 41-3, predetermined operations are executed, and the operation results are supplied to the register 40-4. The operation result of the register 40-4 are supplied to the intermodule interface 17.

As described above, the data supplied from the intermodule interface 17 are subjected to the operation in the first stage, the data of the operation result of the first stage are subjected to the operation in the second stage, and the data of the operation result of the second stage are subjected to the operation in the third stage. In this case, the controller 43 selects data of operation targets supplied to each operation unit so as to arbitrarily configure the connections among the operation units. Hence, it is possible to control the flow of operations data, that is, supply of the result of one stage to another stage, so as to execute desired operation processes. The controller 43 is programmable. When it is necessary to change the operation processes, it is possible to change the specification in the unit of an operation process by changing the flow (connection among the operation units) of operations data by rewriting the control program of the controller 43.

In addition, though the above example uses a three-stage construction, the number of stages is not limited to three, and may be two, or four or more.

In the "Pleiades" described above, the operation units such as the MAC (multiplier accumulator) and the ALU (arithmetic logic unit), the FPGA, and the processor are provided in the same layer in the signal transmission channel. Thus, the amount of data transfer between the operation units, between the operation unit and the FPGA, or between the operation unit and the processor is increased, which degrades the processing performance. On the other hand, in the application-specific platform LSI 10 of the present invention, the arithmetic logic circuit group 12, having an intermediate granularity between the FPGA that allows change for each gate and the processor that allows change by rewriting the software, is configured such that data transfer among the plurality of kinds of operation units is conducted within the arithmetic logic circuit group 12. Accordingly, in the present invention, the operation processing speed of the operation units is not limited by the data transfer rate of the intermodule interface 17. Hence, it is possible to achieve high system performance.

Figure 7:
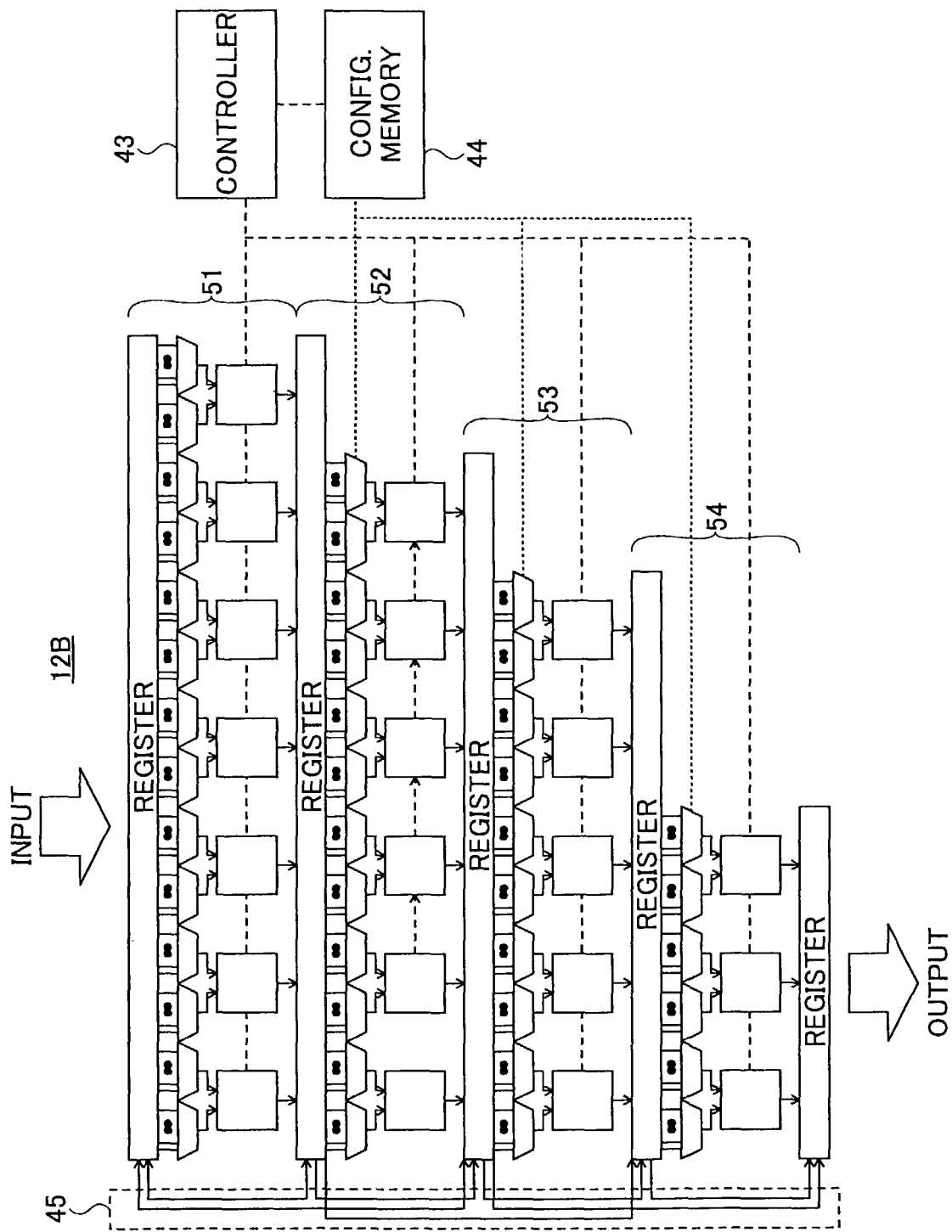
FIG. 7 is an illustrative drawing showing the construction of a second embodiment of the arithmetic logic circuit group.

FIG. 7 is an illustrative diagram showing the construction of a second embodiment of the arithmetic logic circuit group 12.

An arithmetic logic circuit group 12B shown in FIG. 7 includes four stages of operation unit arrays 51 through 54. Similar to the operation unit array of the arithmetic logic circuit group 12A shown in FIG. 6, the operation unit array of each stage is constructed by a register, selectors, and a plurality of operation units. The operation unit arrays 51-54 of four stages are constructed such that the later the stage is, the less the number of the operation units becomes. This corresponds to a condition that the later the stage is, the less the concurrent operations occur, when executing a series of operation processes. That is, each operation unit generates one datum output from one or two data input. Thus, generally, the later the stage is, the less the number of data becomes and the less the number of the operation units required becomes.

In addition, the construction shown in FIG. 7 is provided with a configuration memory 44 and a bypass 45. The bypass 45 is provided for using the operation units in the subsequent stage(s) by directly connecting the registers in the respective stages, in cases where the number of operation units is insufficient and where the operation unit of a required type is not provided in the stage, for example. Hence, it is possible to realize the optimization of operations with a lesser number of the operation units. In addition, the configuration memory 44 is a memory that stores setting information of selection of each selector. It is possible to control the operation of each selector through properly writing setting data to the memory by the controller 43. Hence, it is possible to easily realize complex combinations of selections by the selectors.

Figure 8:
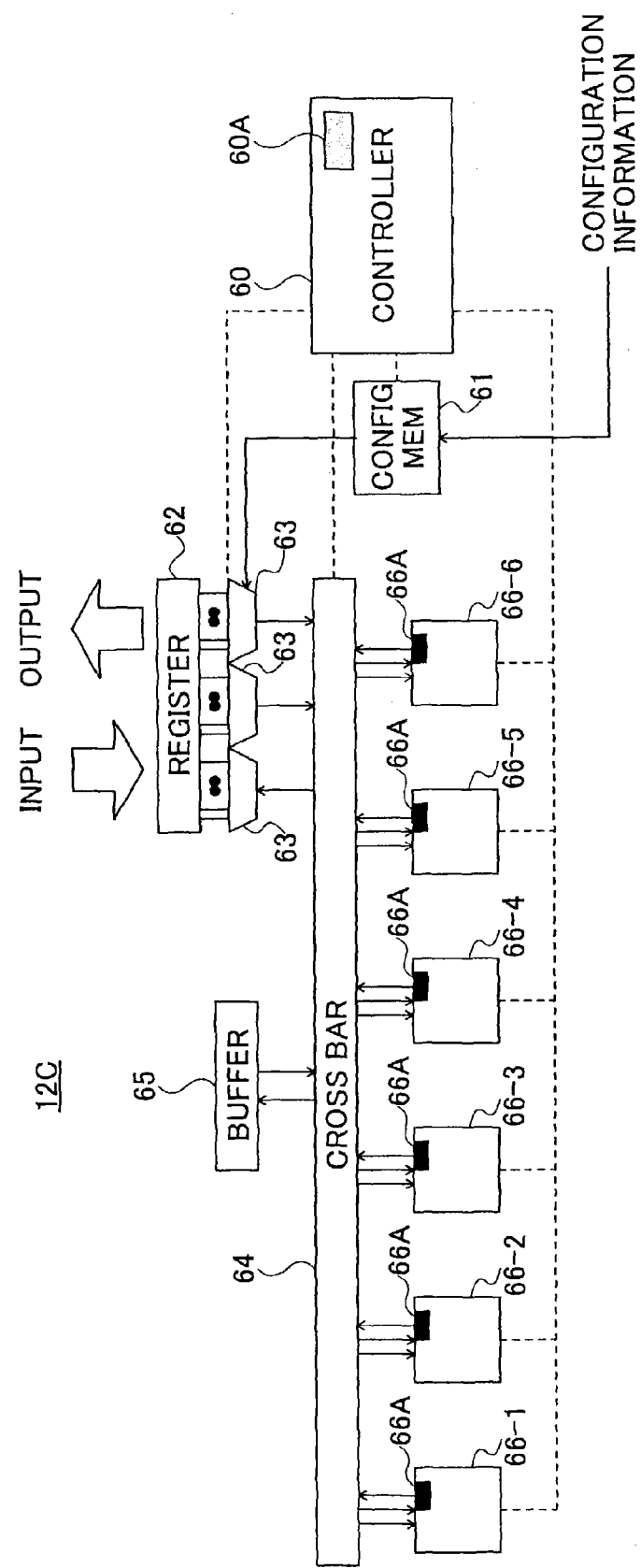
FIG. 8 is an illustrative drawing showing the construction of a third embodiment of the arithmetic logic circuit group.

FIG. 8 is an illustrative drawing showing the construction of a third embodiment of the arithmetic logic circuit group 12.

An arithmetic logic circuit group 12C shown in FIG. 8 includes a controller 60, a configuration memory 61, a register 62, selectors 63, a cross bar 64, a buffer 65, and operation units 66-1 through 66-6.

The data supplied from the intermodule interface 17 are input to and temporarily maintained in the register 62. The register 62 is provided with a plurality of register circuits and can store a plurality of data simultaneously. The data of the register 62 are supplied to the operation units 66-1 through 66-6 via the selectors 63 and the cross bar 64 that are controlled by the controller 60. The setting information regarding selections of the selectors 63 is stored in the configuration memory 61.

The operation units 66-1 through 66-6 are operation units of different kinds and include, for example, an MPY (multiplier), a BIT unit, a MAC (multiplier accumulator), and an ALU (arithmetic logic unit). The operation units 66-1 through 66-6 are operated under the control of the controller 60, each receiving one or two data, executing a predetermined operation, and outputting one datum. It should be noted that a plurality of operation units of the same kind may be provided, or all operation units may be of the same kind. The output data are supplied to the register 62 via the cross bar 64 and the selectors 63. Here, the first operation by the operation unit array ends.

Thereafter, according to the control of the controller 60, the operation of processing the data of the register 62 by the operation units 66-1 through 66-6 and returning the result to the register 62 is repeated for the required number of times. In this case, an intermediate result of the operation is stored in the buffer 65 so that the operation units 66-1 through 66-6 can use the result. Also, registers 66A are provided to respective output parts of the operation units 66-1 through 66-6, so that their outputs can be temporarily maintained. Further, the controller 60 is provided with an address generation circuit 60A, thereby being capable of controlling each unit by address specification.

Additionally, the controller 60 is programmable. When it is necessary to change the operation process, it is possible to change the specification of each operation through rewriting the control program of the controller 60 so as to change the flow (connection among the operation units) of operations data.

Figure 9:
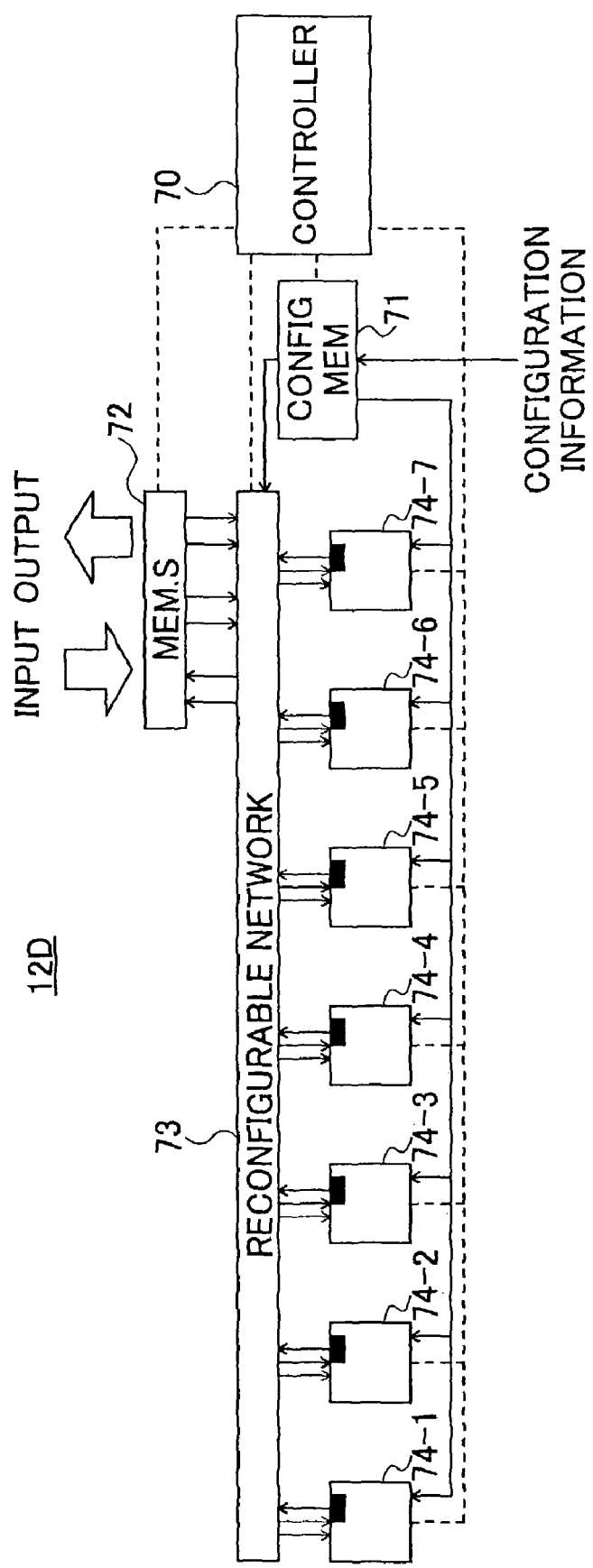
FIG. 9 is an illustrative drawing showing the construction of a fourth embodiment of the arithmetic logic circuit group.

FIG. 9 is an illustrative drawing showing the construction of a fourth embodiment of the arithmetic logic circuit group 12.

An arithmetic logic circuit group 12D shown in FIG. 9 includes a controller 70, a configuration memory 71, a memory 72, a reconfigurable network 73, and operation units 74-1 through 74-7. The operation units 74-1 through 74-7 are operation units of different kinds and include, for example, an MPY (multiplier), a BIT unit, a MAC (multiplier accumulator), an ALU (arithmetic logic unit), and a MOD unit (modulo unit). It should be noted that a plurality of operation units of the same kind may be provided, or all operation units may be of the same kind. The memory 72 is provided in the interface part between the intermodule interface 17 and the arithmetic logic circuit group 12D. In addition, the reconfigurable network 73 that allows free reconfiguration of connection of signal channels is provided between the memory 72 and the operation units 74-1 through 74-7. Configuration data that set the connection of the signal channels of the reconfigurable network 73 are stored in the configuration memory 71. The operation of the arithmetic logic circuit group 12D shown in FIG. 9 is the same as the operation of the arithmetic logic circuit group 12C shown in FIG. 8.

Figure 10:
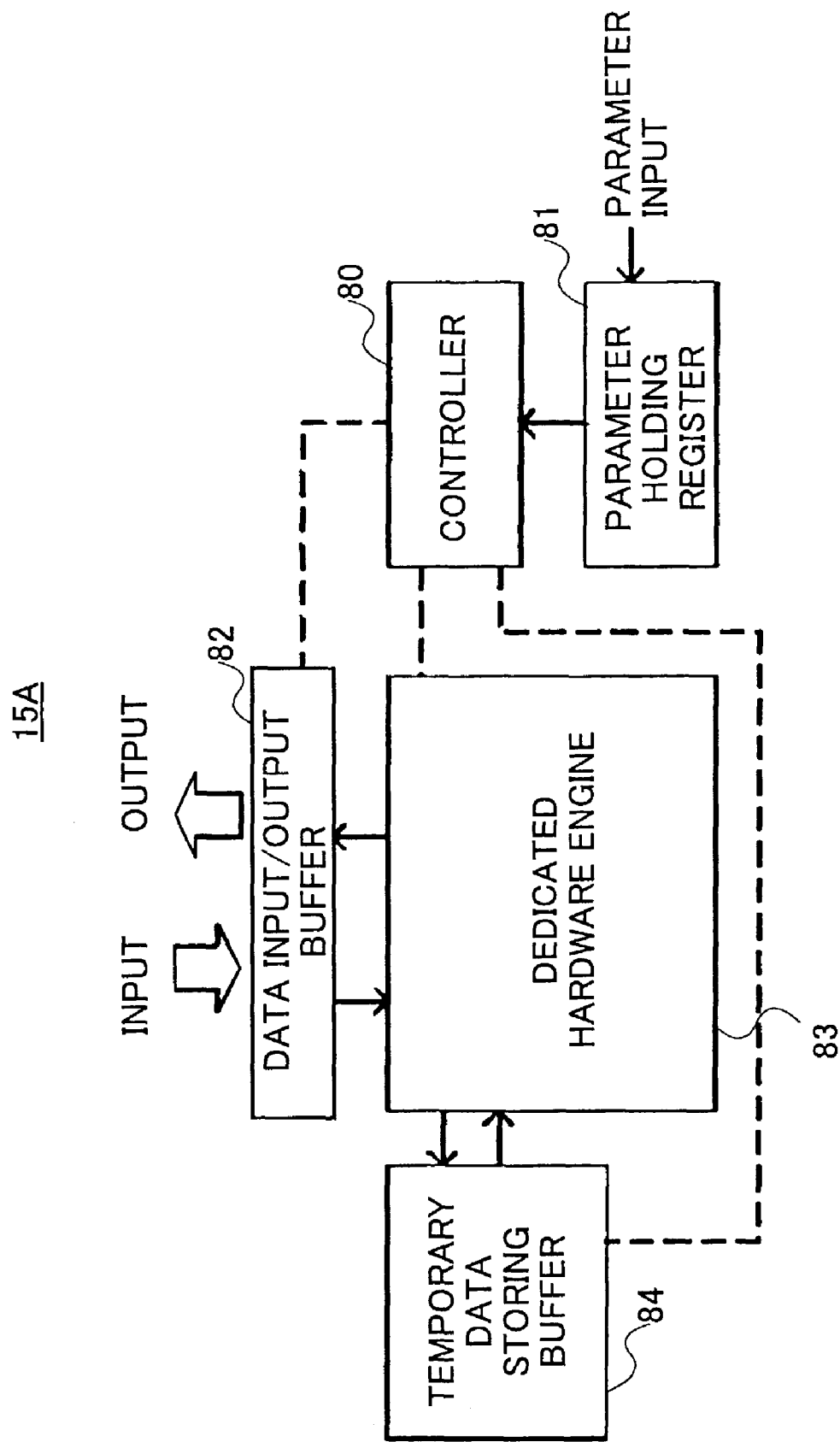
FIG. 10 is a block diagram showing the construction of a first embodiment of parameter-based hardware.

FIG. 10 is an illustrative drawing showing the construction of a first embodiment of the parameter-based dedicated hardware 15.

Parameter-based dedicated hardware 15A shown in FIG. 10 includes a controller 80, a parameter holding register 81, a buffer (data input and output buffer) 82 for data input/output, a dedicated hardware engine 83, and a temporary data storing buffer 84.

The data supplied from the intermodule interface 17 are temporarily stored and maintained in the buffer 82 for data input/output. The data stored in the buffer 82 for data input/output are supplied to the dedicated hardware engine 83, and predetermined data processing is executed by the dedicated hardware engine 83 that is operated under the control of the controller 80. The temporary data storing buffer 84 is a buffer that temporarily stores and maintains an intermediate result of the data processing, when the data processing is executed by the dedicated hardware engine 83.

The dedicated hardware engine 83 is hardware that is designed and manufactured exclusively for executing the predetermined data processing and cannot change the role of its engine. However, the dedicated hardware engine 83 is configured such that parameters, for example, the number of data and accuracy of the processing, can be varied. The information of the parameters is stored in the parameter holding register 81. It is possible to execute a predetermined operation according to a desired specification through operating the dedicated hardware engine 83 by the controller 80 based on the information stored in the parameter holding register 81.

Figure 11:
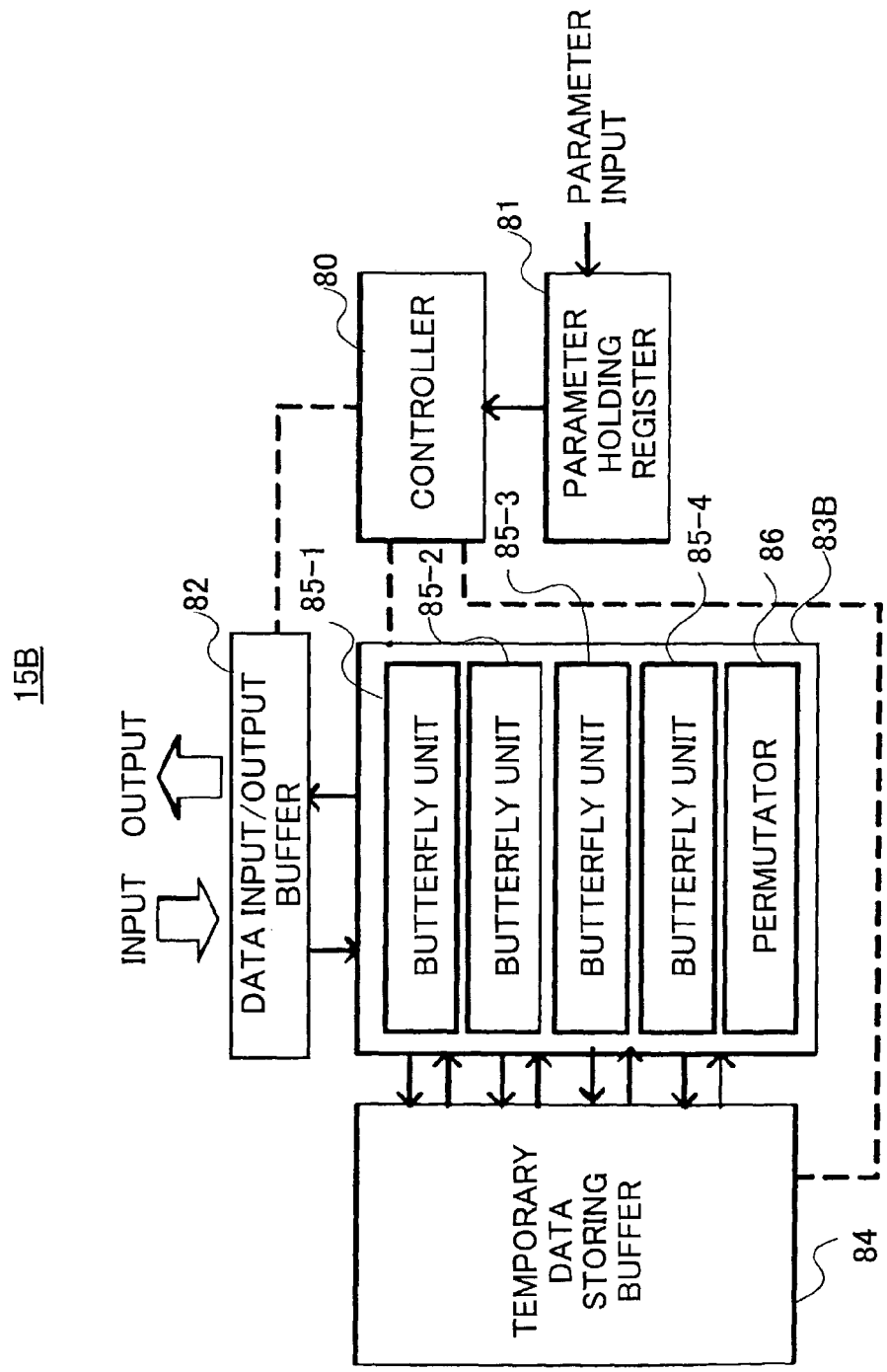
FIG. 11 is a block diagram showing the construction of a second embodiment of the parameter-based hardware.

FIG. 11 is an illustrative diagram showing the construction of a second embodiment of the parameter-based dedicated hardware 15. In FIG. 11, those parts that are the same as those corresponding parts in FIG. 10 are designated by the same reference numerals, and a description thereof will be omitted.

Parameter-based dedicated hardware 15B shown in FIG. 11 is hardware for performing fast Fourier transforms. A dedicated hardware engine 83B includes butterfly units 85-1 through 85-4 for FFT and permutator 86 for a data rearrangement process. It is possible to perform FFTs of different numbers of points (number of data) through controlling the number of times of calculation by the controller 80.

Figure 12:
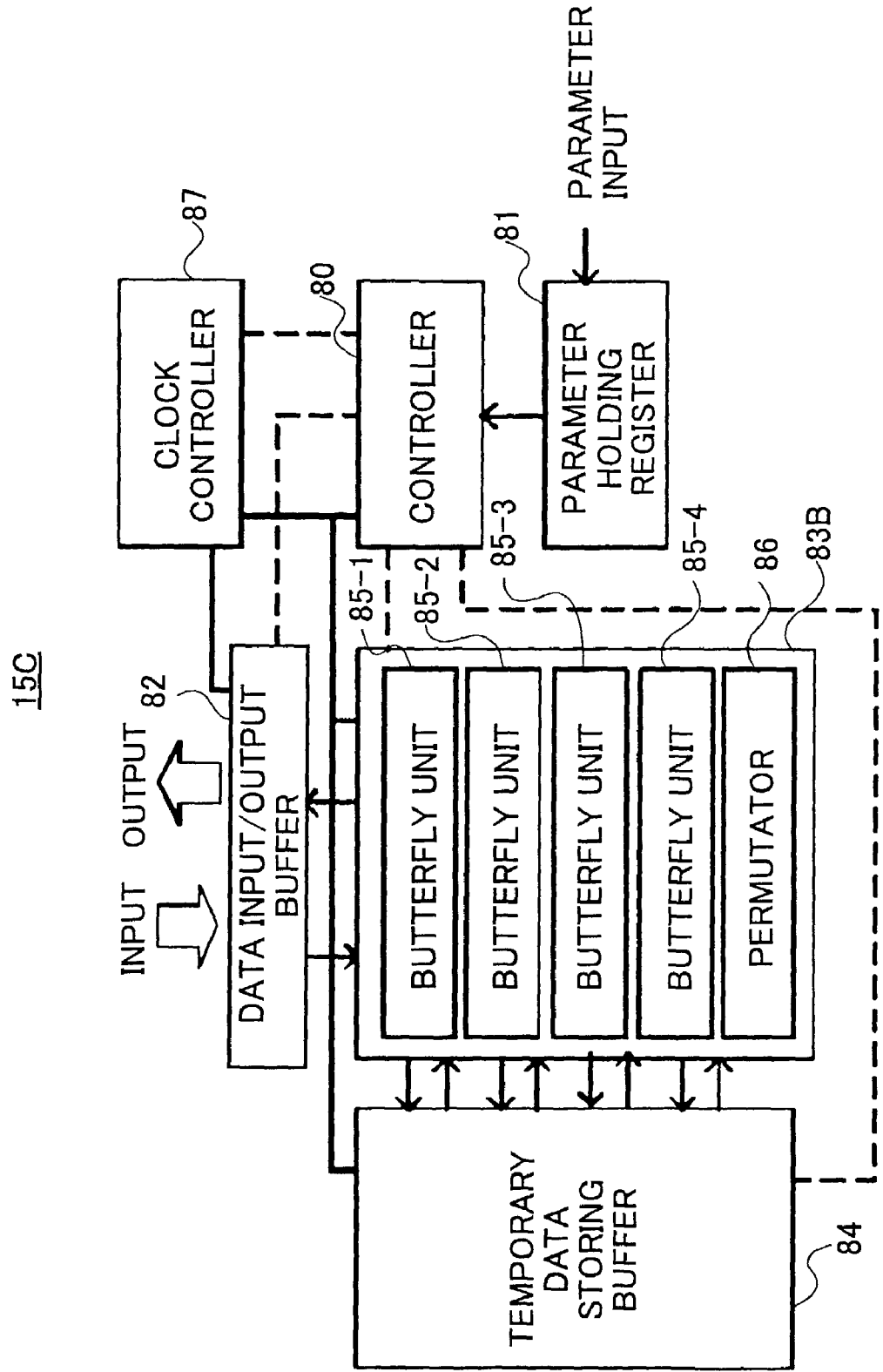
FIG. 12 is a block diagram showing the construction of a third embodiment of the parameter-based hardware.

FIG. 12 is an illustrative diagram showing the construction of a third embodiment of the parameter-based dedicated hardware 15. In FIG. 12, those parts that are the same as those corresponding parts in FIG. 11 are designated by the same reference numerals, and a description thereof will be omitted.

Parameter-based dedicated hardware 15C shown in FIG. 12 is constructed by adding a clock controller 87 to the parameter-based dedicated hardware 15B shown in FIG. 11. The clock controller 87 generates and supplies a clock signal to the controller 80, the buffer 82 for data input/output, the dedicated hardware engine 83B, and temporary data storing buffer 84. These circuit units are operated based on the supplied clock signal. In the parameter-based dedicated hardware 15C shown in FIG. 12, the frequency of the clock signal generated by the clock controller 87 can be varied by parameter setting. Hence, it is possible to control time required for FFT processing. As a result, it is possible to vary a processing mode.

Figure 13:
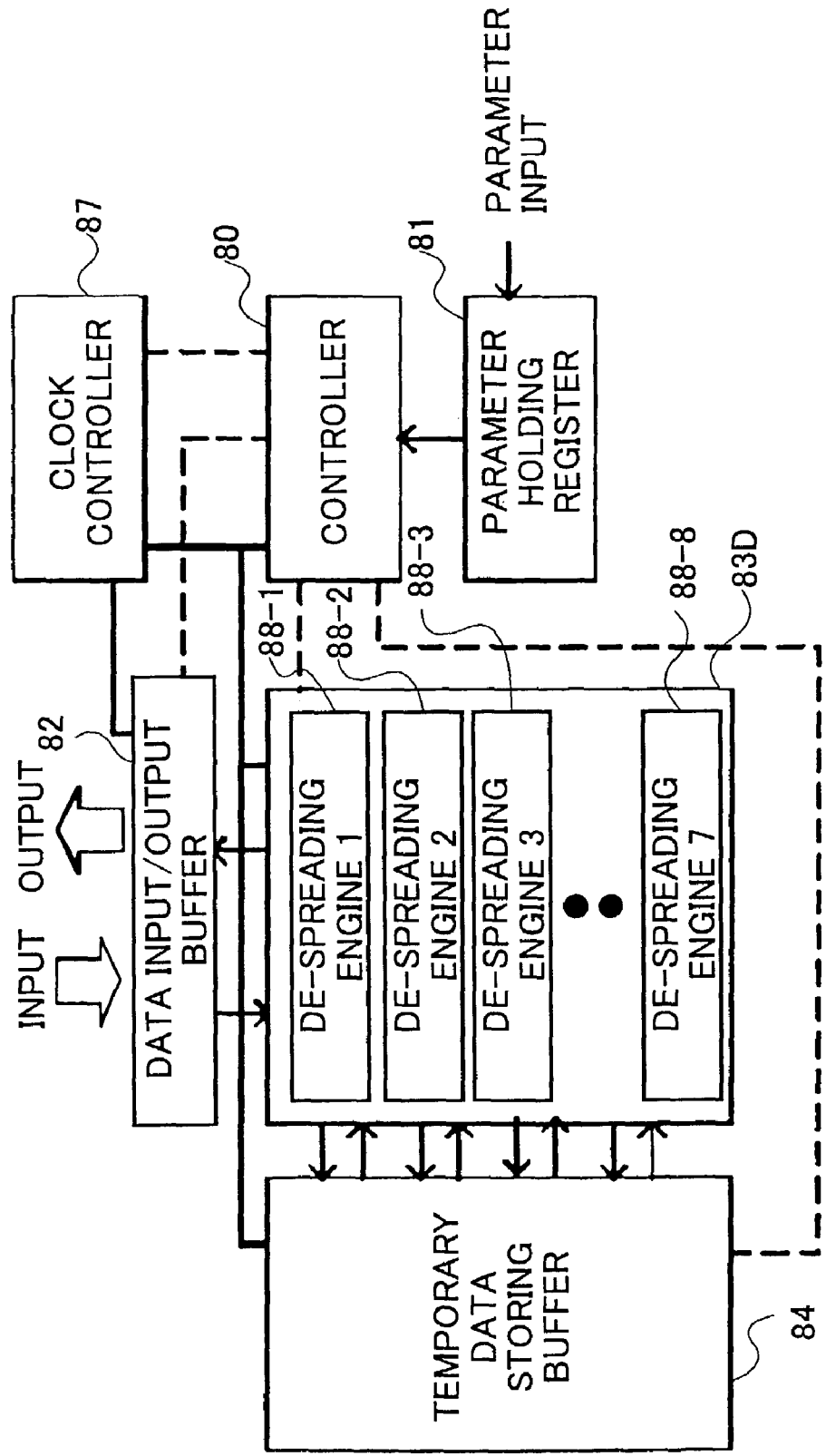
FIG. 13 is a block diagram showing the construction of a fourth embodiment of the parameter-based hardware.

FIG. 13 is an illustrative diagram showing the construction of a fourth embodiment of the parameter-based dedicated hardware 15. In FIG. 13, those parts that are the same as those corresponding parts in FIG. 12 are designated by the same reference numerals, and a description thereof will be omitted.

Parameter-based dedicated hardware 15D shown in FIG. 13 is hardware for executing a de-spreading process in spread spectrum communication. A dedicated hardware engine 83D includes de-spreading engines 88-1 through 88-8 for de-spreading processes. That is, it is possible to perform an 8-finger de-spreading process. Also, it is possible to realize de-spreading processes of 16, 32, and 48 fingers through varying the control operation of the controller 80 by parameter setting and executing a time-division process by the eight de-spreading engines 88-1 through 88-8. When the number of fingers is increased by the time-division process as described above, it is necessary to increase the frequency of the clock signal that is generated by the clock controller 87, and end a predetermined process within a predetermined time period.

Hereinbelow, a description will be given of system development in the application-specific platform LSI according to the present invention.

In the field of software, object oriented designing methods are developed and used for solving problems in specification change and maintenance in top-down approaches. In the object oriented designing methods, components of software are constructed by objects that are easy for humans to intuitively understand, and the entire software program is formed by building interrelationships among the objects. Such designing methods are advantageous in that specification change, for example, can be easily performed through merely changing and replacing the objects and varying the relationships among the objects for changing the specification, since the software is constructed by the small objects.

In the present invention, a system including hardware as well as software is constructed by objects so as to facilitate specification change caused by change of objects. In a system designed by an object oriented designing method, processes each constructed by at least one object are mapped to respective modules of the application-specific platform LSI of the present invention.

The objects mapped to a processor and reconfigurable hardware parts allow specification change. Accordingly, it is possible to perform specification change, which is impossible in SOCs. In this case, the specification change can be easily performed since the relationships between the objects that are the targets of the specification change and the modules of the LSI are clear.

Figure 14:
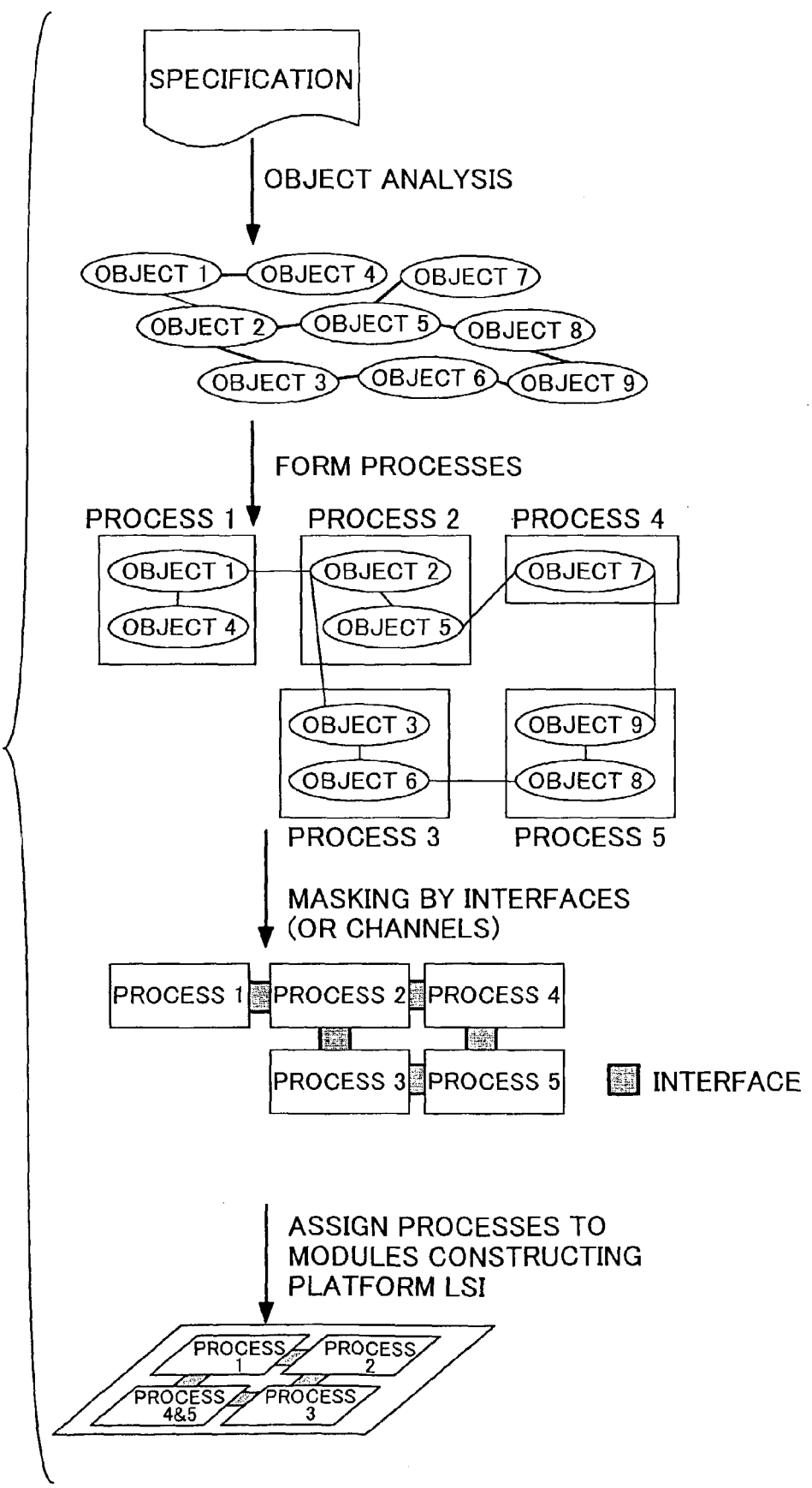
FIG. 14 is an illustrative drawing showing an example of the system development in the application-specific platform LSI.

FIG. 14 shows an example of system development in the application-specific platform LSI.

First, based on a specification, object analysis with respect to a system is performed, and the system is described as relationships among objects. At this stage, there is no distinction between software and hardware.

Next, related objects are put together to form (generate) processes. On this occasion, the processes are formed (generated) under conditions that the amount of traffic among the processes is smaller than the amount of traffic within the processes, and the relationships among the processes are not too many, for example. At this stage, there is no distinction between software and hardware.

Then, communication among the processes is described in an abstract form such as interfaces and channels. At this stage, there is no distinction between software and hardware.

Last, the processes are assigned to the respective modules constructing the application-specific platform LSI. On this occasion, the communication described with interfaces or channels is mapped to middleware or resources for communication on the application-specific platform LSI. At this stage, the mapping is performed with distinction between hardware and software. The system is optimized through optimizing the assignment of the processes to the modules.

Additionally, since the processes are constructed by the objects, it is easy to move the objects among the processes, and it is also easy to perform an operation of optimization for reconfiguring the processes. Further, it should be noted that this designing method is applicable to, for example, normal SOCs as well as the application-specific platform LSIs.

In the designing method described above, not programming of a single process (single thread) but programming of multi-processes (multi-threads) is performed. It is possible to reduce the amount of data transfer among the modules by assigning the processes (threads) to the respective modules (processor, arithmetic logic circuit groups, reconfigurable gate arrays, dedicated hardware, parameter-based hardware, for example). Each of the processes (threads) is constructed by at least one object. Accordingly, it is easy to move among the processes.

As described above, at the programming stage, it is not necessary to be aware of inter-hardware communication, inter-software communication, and communication between hardware and software, as a result of describing the communication among the processes (threads) with descriptions having a high level of abstraction, such as interface descriptions and channel descriptions. In order to realize this, hardware modules (running a part of inter-hardware communication and communication between software and hardware) corresponding to the interfaces or channels are provided. Also, drivers connecting software and hardware and a library connecting software are provided.

In addition, it should be noted that communication among the threads or the processes of the modules is controlled by software executed by the processor 11.

Hereinbelow, a specific description will be given of a system development method of the application-specific platform LSI according to the present invention.

The UML may be used for object analysis that is the initial stage, followed by implementation in C++. At the next stage, the objects are put together to form (generate) processes. At the further next stage, processes and interfaces are separated. On this occasion, the interfaces and the processes may be expressed by System C, for example. At the next stage, the processes are mapped to respective modules of the application-specific platform LSI. On this occasion, optimization is performed by adjusting the mapping while evaluating the performance. In addition, it should be noted that the description language to be used may be JAVA (registered trademark) instead of C++. An arbitrary language may be used as long as the language is an objected oriented language. Also, the interface description is not limited to System C, and JINI and CORBA, for example, may be used.

Figure 15:
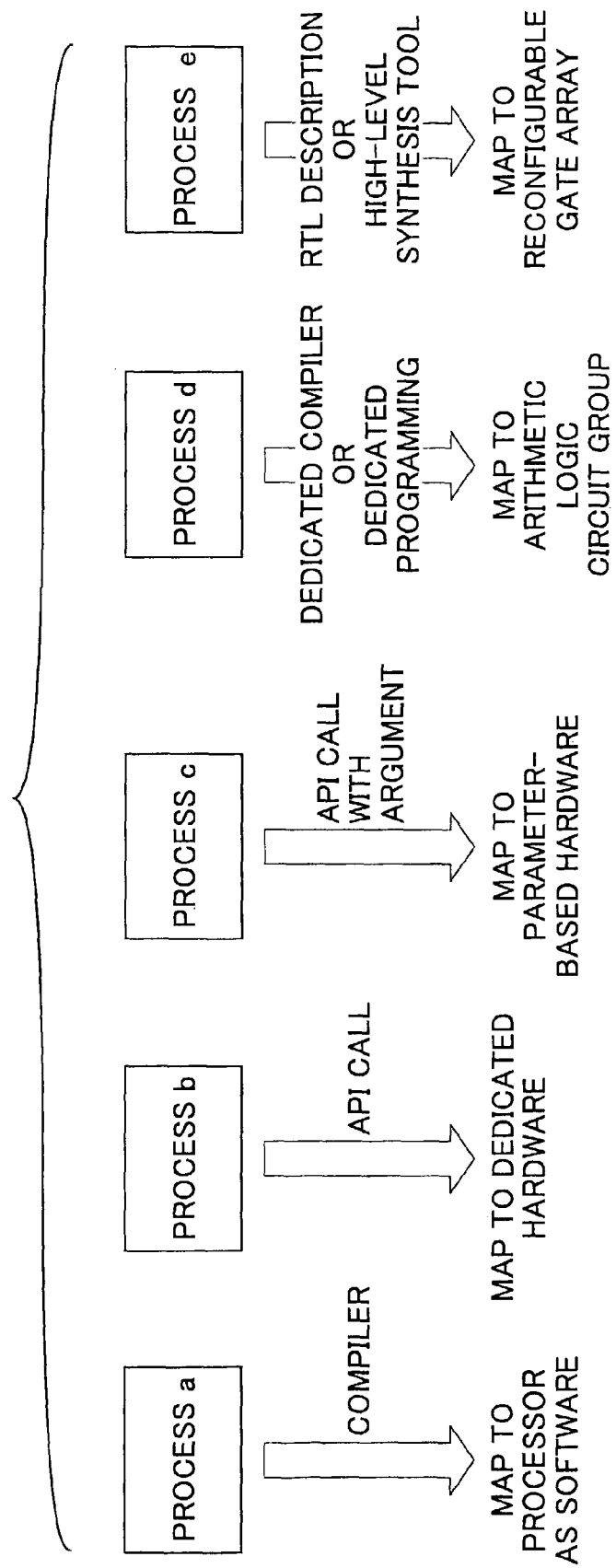
FIG. 15 is an illustrative drawing showing an example of a method of mapping processes to respective modules of the application-specific platform LSI.

FIG. 15 shows an example of a method of mapping the processes to the respective modules of the application-specific platform LSI.

When a target module of assignment is a processor, the processes are mapped as software objects. On this occasion, it is a compiler that generates the software objects. Also, predetermined processes are mapped to dedicated hardware as the processes to be called by API calls. In addition, the processes capable of using parameterized hardware are mapped to parameter-based dedicated hardware as the processes to be called by API calls with arguments. The processes having problems in speed in software processing by the processor are mapped to arithmetic logic circuit groups and reconfigurable gate arrays. In the mapping to the arithmetic logic circuit groups, a dedicated compiler is used or dedicated programming is performed. Further, in the mapping to the reconfigurable gate arrays, the processes are mapped as circuits with RTL description or a high-level synthesis tool.

In addition, as described above, the interfaces are described by channels or signals of System C, for example. These interfaces are mapped to the optimum communication methods according to the types of the modules to which related processes are mapped. For example, in the case of inter-hardware communication, the interface is mapped to the interface between modules; in the case of communication between software and hardware, the interface is converted to the interface between a driver and a module; and in the case of inter-software communication, the interface is converted to an interprocess communication library.

With the above operations, it is possible to map the processes and interfaces of a system to the application-specific platform LSI.

In the present invention, it is possible to optimize power consumption, performance, and specification change capability by mounting a plurality of different modules each having a different granularity (the size of a reconfigurable unit). In addition, each arithmetic logic circuit is not independently connected to the intermodule interface, but the reconfigurable connection channel is provided in and the plurality of arithmetic logic circuits are included in the arithmetic logic circuit group. Thus, the construction in which data transfer among the plurality of operation units is conducted within the arithmetic logic circuit group is realized. Accordingly, in the present invention, it is possible to achieve a high system performance without limiting the processing speeds of the operation units due to the data transfer rate on the intermodule interface.

Additionally, in the present invention, it is possible to easily perform specification change caused by change of objects, for example, by constructing a system including hardware with objects. Those objects mapped to the processor part and the reconfigurable hardware parts allow the specification change. Also, the relationships between the objects that are the targets of specification change and the modules of an integrated circuit are clear. Thus, it is possible to easily perform specification change.

The present invention is not limited to the specifically disclosed embodiments, and variations and modifications may be made without departing from the scope of the present invention.

What is claimed is:

1. An integrated circuit, comprising:
   a processor;
   an arithmetic logic circuit group including a plurality of operation units inclusive of two or more arithmetic logic units, and including connection channels connecting between said operation units in a reconfigurable manner, said arithmetic logic circuit group not being a Field Programmable Gate Array;
   parameter-based dedicated hardware configured to execute predetermined data processing and changing a process specification thereof by parameter setting, the parameter setting indicating at least one of a number of data and accuracy of the data processing;
   an intermodule interface connecting said processor, said arithmetic logic circuit group, and said parameter-based dedicated hardware to each other;
   a reconfigurable gate array connected to the intermodule interface and allowing logic change at a gate level; and
   wherein the processor has a first granularity the arithmetic logic circuit group has a second granularity lower than the first granularity and higher than a gate-level granularity of the reconfigurable gate array; and data transfer among the plurality of operation units is conducted within the arithmetic logic circuit group, so that an operation processing speed of the operation units is not limited by a data transfer rate of the intermodule interface, wherein the parameter-based dedicated hardware comprises:
- a data input and output buffer connected to the intermodule interface;
- a dedicated hardware engine connected to said data input and output buffer and executing a specific process; and
- a controller controlling an operation and a process specification of said dedicated hardware based on parameters;
- a temporary data storing buffer configured to temporarily store and maintain an intermediate result of the specific process when the specific process is executed by the dedicated hardware engine;
- a parameter holding register configured to supply the parameters to the controller; and
- a clock controller configured to generate and supply a clock signal to the controller, the data input and output buffer, the dedicated hardware engine, and the temporary data storing buffer, wherein the plurality of operation units include different types of operation units, and the arithmetic logic circuit group further includes:
- a configuration memory configured to store processing information regarding each of the plurality of the units and coupling information between the plurality of the units; and
- a controller controlling the plurality of the units based on the processing information and the coupling information, and
- wherein the arithmetic logic circuit group includes a plurality of stages of operation unit arrays, each of the plurality of stages including a register, selectors, and plural operation units, wherein the later a given stage in the plurality of stages, fewer number of operation units are included in the given stage.

2. The integrated circuit as claimed in claim 1, wherein the arithmetic logic circuit group further comprises:
- a data storing circuit connected to the intermodule interface;
- a connection circuit establishing a signal path between said data storing circuit and the operation units and capable of reconfiguring connection of the signal path; and
- a control circuit controlling the connection of the signal path of the connection circuit.

3. The integrated circuit as claimed in claim 2, wherein the connection circuit establishes a reconfigurable signal path among the operation units.

4. The integrated circuit as claimed in claim 1, further comprising:
dedicated hardware connected to the intermodule interface and executing a specific process.

5. The integrated circuit as claimed in claim 1, further comprising:
a shared memory connected to the intermodule interface.

6. The integrated circuit as claimed in claim 1, wherein the intermodule interface is a reconfigurable network capable of changing a connection channel thereof.

7. The integrated circuit as claimed in claim 1, wherein the plurality of operation units are arranged in a plurality of operation stages each including different types of operation units, and the controller selects one of the operation stages based on the processing information and the coupling information.

8. The integrated circuit as claimed in claim 1, wherein the plurality of operation units are coupled to one another through a crossbar or reconfigurable network, and the controller controls connections in the crossbar or reconfigurable network based on the processing information and the coupling information.

9. The integrated circuit as claimed in claim 1, wherein if an operation unit of a required type is not provided in a given one of the plurality of stages, an operation unit of the required type is provided in another one of the plurality of stages and used for processing.

10. A system development method of programming an integrated circuit, comprising:
- providing an arithmetic logic circuit group having a plurality of operation units inclusive of two or more arithmetic logic units and connection channels connecting between the operation units in a reconfigurable manner, said arithmetic logic circuit group not being a Field Programmable Gate Array;
- configuring parameter-based dedicated hardware to execute predetermined data processing and changing a process specification thereof by parameter setting indicating at least one of a number of data and accuracy of the data processing;
- connecting, via an intermodule interface, a processor, the arithmetic logic circuit group, and the parameter-based dedicated hardware to each other;
- providing a reconfigurable gate array connected to the intermodule interface and allowing logic change at a gate level, wherein the processor has a first granularity, and the arithmetic logic circuit group has a second granularity lower than the first granularity and higher than a gate-level granularity of the reconfigurable gate array, and data transfer among the plurality of operation units is conducted within the arithmetic logic circuit group, so that an operation processing speed of the operation units is not limited by a data transfer rate of the intermodule interface;
- generating objects and relationships among the objects through object analysis;
- generating processes each including at least one of the objects by putting the objects that are related to each other together; and
- assigning the processes to the processor, the arithmetic logic circuit group, and the parameter-based dedicated hardware of the integrated circuit, wherein the parameter-based dedicated hardware comprises:
- a data input and output buffer connected to the intermodule interface;
- a dedicated hardware engine connected to said data input and output buffer and executing a specific process;
- a controller controlling an operation and a process specification of said dedicated hardware based on parameters;
- a temporary data storing buffer configured to temporarily store and maintain an intermediate result of the specific process when the specific process is executed by the dedicated hardware engine;
- a parameter holding register configured to supply the parameters to the controller; and
- a clock controller configured to generate and supply a clock signal to the controller, the data input and output buffer, the dedicated hardware engine, and the temporary data storing buffer, wherein the plurality of operation units include different types of operation units, and wherein the arithmetic logic circuit group further includes:
a configuration memory configured to store processing information regarding each of the plurality of the units and coupling information between the plurality of the units; and
a controller controlling the plurality of the units based on the processing information and the coupling information, and
wherein the arithmetic logic circuit group includes a plurality of stages of operation unit arrays, each of the plurality of stages including a register, selectors, and plural operation units, wherein the later a given stage in the plurality of stages, fewer number of operation units are included in the given stage.

11. The system development method as claimed in claim 10, further comprising of:
describing communications among the processes in a predetermined language as communication interfaces; and
mapping the communication interfaces described in the predetermined language to at least one of a resource of the intermodule interface, a driver for hardware, and a software library of interprocess communication.

12. A data processing method, comprising:
executing a multi process operation in an integrated circuit including a processor, an arithmetic logic circuit group having a plurality of operation units inclusive of two or more arithmetic logic units and having connection channels connecting between said operation units in a reconfigurable manner, said arithmetic logic circuit group not being a Field Programmable Gate Array;
configuring parameter-based dedicated hardware to execute predetermined data processing and changing a process specification thereof by parameter setting indicating at least one of a number of data and accuracy of the data processing, and
connecting, via an intermodule interface, said processor, said arithmetic logic circuit group, and said parameter-based dedicated hardware to each other;
providing a reconfigurable gate array connected to the intermodule interface and allowing logic change at a gate level,
wherein the processor has a first granularity and the arithmetic logic circuit group has a second granularity lower than the first granularity and higher than a gate-level granularity of the reconfigurable gate array,
wherein data transfer among the plurality of operation units is conducted within the arithmetic logic circuit group, so that an operation processing speed of the operation units is not limited by a data transfer rate of the intermodule interface, said executing of the multi process operation being performed by assigning a plurality of processes of data processing to said processor, said arithmetic logic circuit group, and said parameter-based dedicated hardware,
wherein the parameter-based dedicated hardware comprises:
a data input and output buffer connected to the intermodule interface;
a dedicated hardware engine connected to said data input and output buffer and executing a specific process;
a controller controlling an operation and a process specification of said dedicated hardware based on parameters;
a temporary data storing buffer configured to temporarily store and maintain an intermediate result of the specific process when the specific process is executed by the dedicated hardware engine;
a parameter holding register configured to supply the parameters to the controller; and
a clock controller configured to generate and supply a clock signal to the controller, the data input and output buffer, the dedicated hardware engine, and the temporary data storing buffer,
wherein the plurality of operation units include different types of operation units, and
the arithmetic logic circuit group further includes:
a configuration memory configured to store processing information regarding each of the plurality of the units and coupling information between the plurality of the units; and
a controller controlling the plurality of the units based on the processing information and the coupling information, and
wherein the arithmetic logic circuit group includes a plurality of stages of operation unit arrays, each of the plurality of stages including a register, selectors, and plural operation units, wherein the later a given stage in the plurality of stages, fewer number of operation units are included in the given stage.

13. A data processing method, comprising:
executing a multi process operation in an integrated circuit including a processor, an arithmetic logic circuit group having a plurality of operation units inclusive of two or more arithmetic logic units and having connection channels connecting between said operation units in a reconfigurable manner, said arithmetic logic circuit group not being a Field Programmable Gate Array;
configuring parameter-based dedicated hardware to execute predetermined data processing and changing a process specification thereof by parameter setting indicating at least one of a number of data and accuracy of the data processing, a reconfigurable gate array allowing logic change at a gate level; and
connecting, via an intermodule interface, said processor, said arithmetic logic circuit group, said reconfigurable gate array, said parameter-based dedicated hardware and said reconfigurable gate array to each other,
wherein the processor has a first granularity, and the arithmetic logic circuit group has a second granularity lower than the first granularity and higher than a gate-level granularity of the reconfigurable gate array,
wherein data transfer among the plurality of operation units is conducted within the arithmetic logic circuit group, so that an operation processing speed of the operation units is not limited by a data transfer rate of the intermodule interface, said executing of the multi process operation being performed by assigning a plurality of processes of data processing to said processor, said arithmetic logic circuit group, said reconfigurable gate array, and said parameter-based dedicated hardware, and
wherein the parameter-based dedicated hardware comprises:
a data input and output buffer connected to the intermodule interface;
a dedicated hardware engine connected to said data input and output buffer and executing a specific process;

a controller controlling an operation and a process specification of said dedicated hardware based on parameters;

a temporary data storing buffer configured to temporarily store and maintain an intermediate result of the specific process when the specific process is executed by the dedicated hardware engine;

a parameter holding register configured to supply the parameters to the controller; and a clock controller configured to generate and supply a clock signal to the controller, the data input and output buffer, the dedicated hardware engine, and the temporary data storing buffer, wherein the plurality of operation units include different types of operation units, and the arithmetic logic circuit group further includes:

a configuration memory configured to store processing information regarding each of the plurality of the units and coupling information between the plurality of the units; and a controller controlling the plurality of the units based on the processing information and the coupling information and wherein the arithmetic logic circuit group includes a plurality of stages of operation unit arrays, each of the plurality of stages including a register, selectors, and plural operation units, wherein the later a given stage in the plurality of stages, fewer number of operation units are included in the given stage.

14. A data processing method, comprising:

executing a multi process operation in an integrated circuit including a processor, an arithmetic logic circuit group having a plurality of operation units inclusive of two or more arithmetic logic units and having connection channels connecting between said operation units in a reconfigurable manner, said arithmetic logic circuit group not being a Field Programmable Gate Array;

configuring parameter-based dedicated hardware to execute predetermined data processing and changing a process specification thereof by parameter setting indicating at least one of a number of data and accuracy of the data processing;

providing a dedicated hardware executing a specific process;

connecting, via an intermodule interface, said processor, said arithmetic logic circuit group, and said parameter-based dedicated hardware executing the specific process to each other; and providing a reconfigurable gate array connected to the intermodule interface and allowing logic change at a gate level, wherein the processor has a first granularity, and the arithmetic logic circuit group has a second granularity lower than the first granularity and higher than a gate-level granularity of the reconfigurable gate array, wherein data transfer among the plurality of operation units is conducted within the arithmetic logic circuit group, so that an operation processing speed of the operation units is not limited by a data transfer rate of the intermodule interface, said executing of the multi process operation being performed by assigning a plurality of processes of data processing to said processor, said arithmetic logic circuit group, said parameter-based dedicated hardware, and said dedicated hardware executing the specific process, and wherein the parameter-based dedicated hardware comprises:

a data input and output buffer connected to the intermodule interface;

a dedicated hardware engine connected to said data input and output buffer and executing a specific process;

a controller controlling an operation and a process specification of said dedicated hardware based on parameters;

a temporary data storing buffer configured to temporarily store and maintain an intermediate result of the specific process when the specific process is executed by the dedicated hardware engine;

a parameter holding register configured to supply the parameters to the controller; and a clock controller configured to generate and supply a clock signal to the controller, the data input and output buffer, the dedicated hardware engine, and the temporary data storing buffer, wherein the plurality of operation units include different types of operation units, and the arithmetic logic circuit group further includes:

a configuration memory configured to store processing information regarding each of the plurality of the units and coupling information between the plurality of the units; and a controller controlling the plurality of the units based on the processing information and the coupling information, and wherein the arithmetic logic circuit group includes a plurality of stages of operation unit arrays, each of the plurality of stages including a register, selectors, and plural operation units, wherein the later a given stage in the plurality of stages, fewer number of operation units are included in the given stage.

* * * * *

UNITED STATES PATENT AND TRADEMARK OFFICE
CERTIFICATE OF CORRECTION

| | | |
|---|---|---|
| PATENT NO. | : 7,716,458 B2 | Page 1 of 1 |
| APPLICATION NO. | : 10/461427 | |
| DATED | : May 11, 2010 | |
| INVENTOR(S) | : Miyoshi Saito et al. | |

It is certified that error appears in the above-identified patent and that said Letters Patent is hereby corrected as shown below:

First page Column 2 (Other Publications), Line 2, change "Publiahws" to --Published--.

Column 12, Line 62, change "granularity" to --granularity,--.

Column 15, Line 45, change "granularity" to --granularity,--.

Column 17, Line 22-23, change "information" to --information,--.

Signed and Sealed this
Fourth Day of January, 2011

David J. Kappos
*Director of the United States Patent and Trademark Office*